United States Patent
Lee et al.

(10) Patent No.: US 7,920,797 B2
(45) Date of Patent: Apr. 5, 2011

(54) RECEIVER HAVING AN APPARATUS FOR VARYING DECISION THRESHOLD LEVEL AND AN OPTICAL TRANSMISSION SYSTEM HAVING THE SAME

(75) Inventors: Chang-Hee Lee, Daejeon (KR); Sil-Gu Mun, Daegu (KR)

(73) Assignee: Korea Advanced Institute of Science and Technology (KR)

( * ) Notice: Subject to any disclaimer, the term of this patent is extended or adjusted under 35 U.S.C. 154(b) by 497 days.

(21) Appl. No.: 11/747,168

(22) Filed: May 10, 2007

(65) Prior Publication Data
US 2007/0206964 A1 Sep. 6, 2007

Related U.S. Application Data

(63) Continuation of application No. PCT/KR2006/003262, filed on Aug. 18, 2006.

(30) Foreign Application Priority Data

Aug. 19, 2005 (KR) .................. 10-2005-0076330

(51) Int. Cl.
*H04B 10/06* (2006.01)
(52) U.S. Cl. ...................................... 398/210; 398/208
(58) Field of Classification Search .................. 398/68, 398/168, 208, 209, 210, 211
See application file for complete search history.

(56) References Cited

U.S. PATENT DOCUMENTS

| | | | | |
|---|---|---|---|---|
| 5,369,656 A | * | 11/1994 | Ackley et al. | 398/141 |
| 5,933,265 A | | 8/1999 | Nagarajan | |
| 7,522,848 B2 | * | 4/2009 | Schulz | 398/209 |
| 2004/0208208 A1 | | 10/2004 | Shin et al. | |
| 2005/0074240 A1 | | 4/2005 | Jung et al. | |

FOREIGN PATENT DOCUMENTS

JP 2002-204210 A 7/2002
WO WO 2004107628 A1 * 12/2004

OTHER PUBLICATIONS

International Search Report dated Dec. 7, 2006 in PCT Application PCT/KR2006/003262, which is the parent application of this application.

* cited by examiner

*Primary Examiner* — Nathan M Curs
(74) *Attorney, Agent, or Firm* — Knobbe Martens Olson & Bear LLP

(57) ABSTRACT

The disclosure relates to an optical receiver having an apparatus for varying decision threshold level and an optical transmission system having the same. An optical receiver having an apparatus for varying decision threshold level includes a photo diode (PD) for receiving an optical signal and transforming the received optical signal into an electrical signal; a trans-impedance amplifier (TIA) for pre-amplifying the electrical signal transformed by the PD; a limiting amplifier (LA) for deciding the electrical signal amplified by the TIA as either level 0 or level 1 and for amplifying the decision signal; a clock and data recovery (CDR) for generating a clock and data from the amplified decision signal by the LA; and a control circuit for adjusting a decision threshold level depending on the received optical signal power by the PD and for providing the adjusted decision threshold level with the LA.

18 Claims, 6 Drawing Sheets

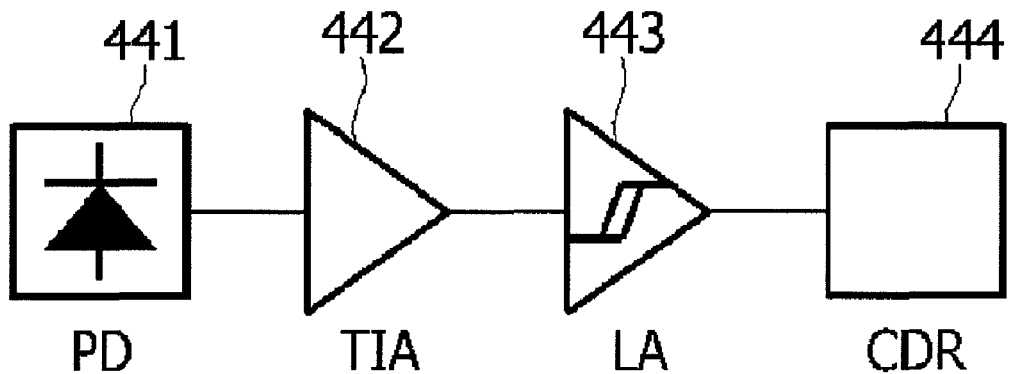
[Fig. 1]
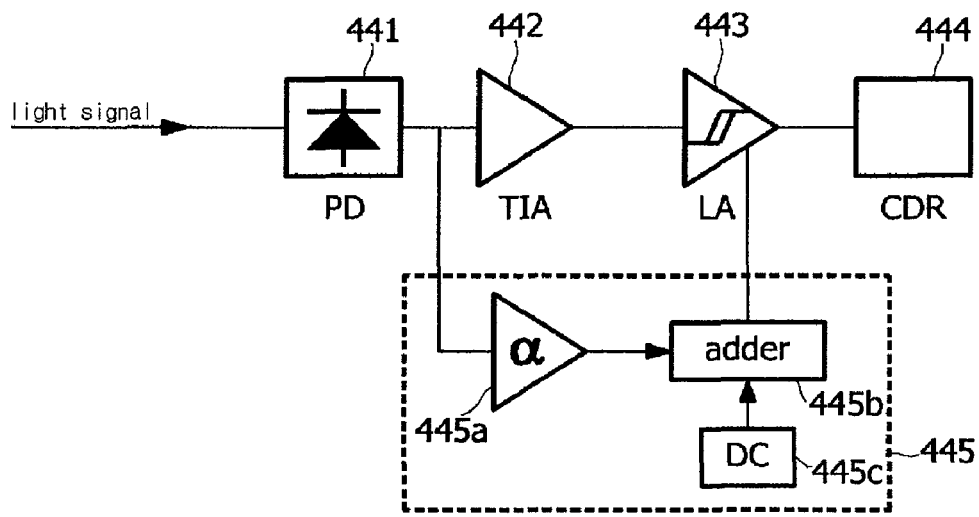
[Fig. 2]
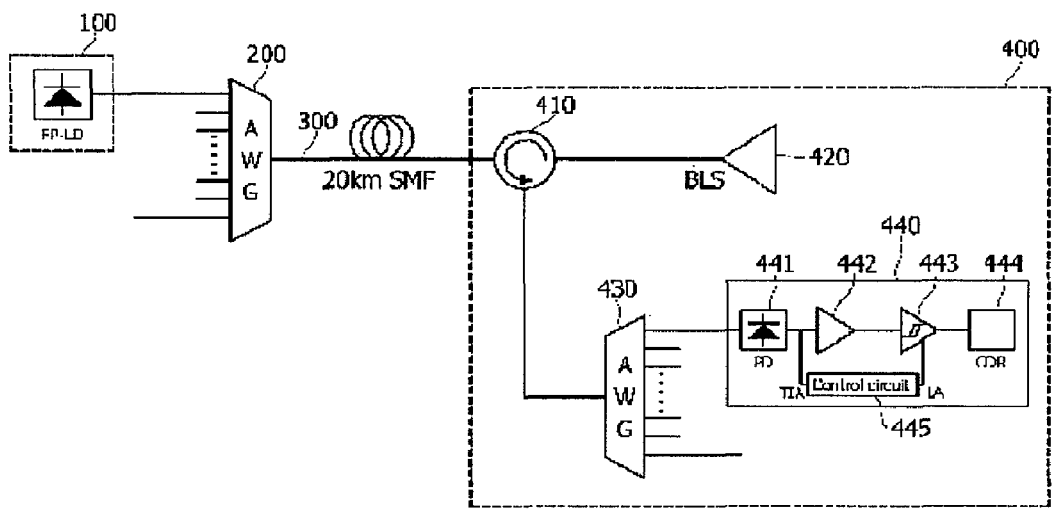
[Fig. 3]

[Fig. 4]
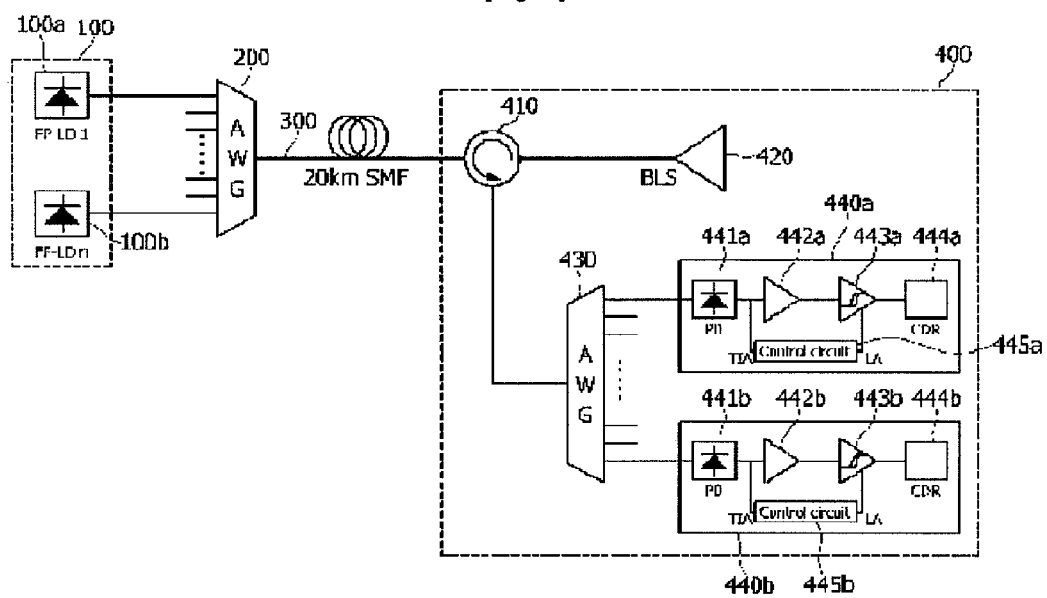
[Fig. 5]
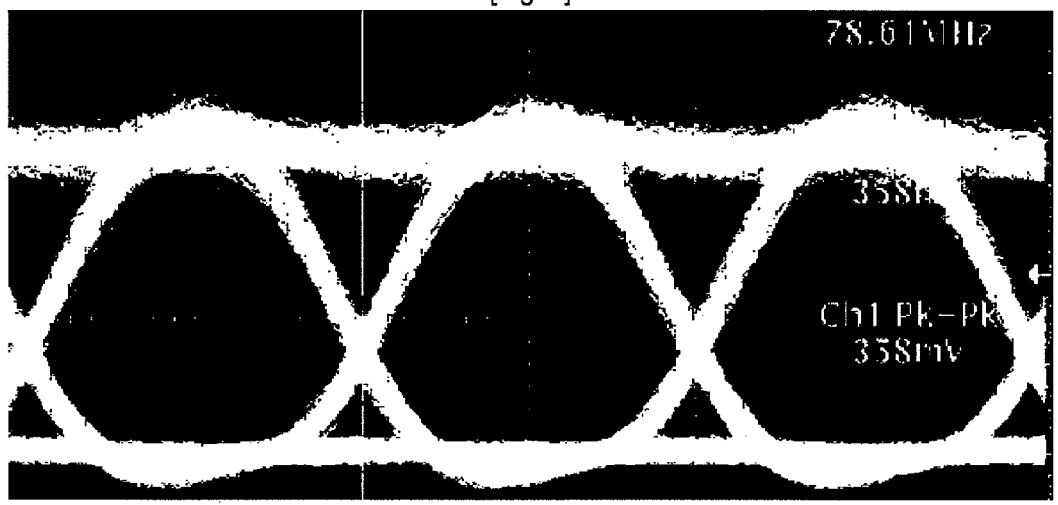

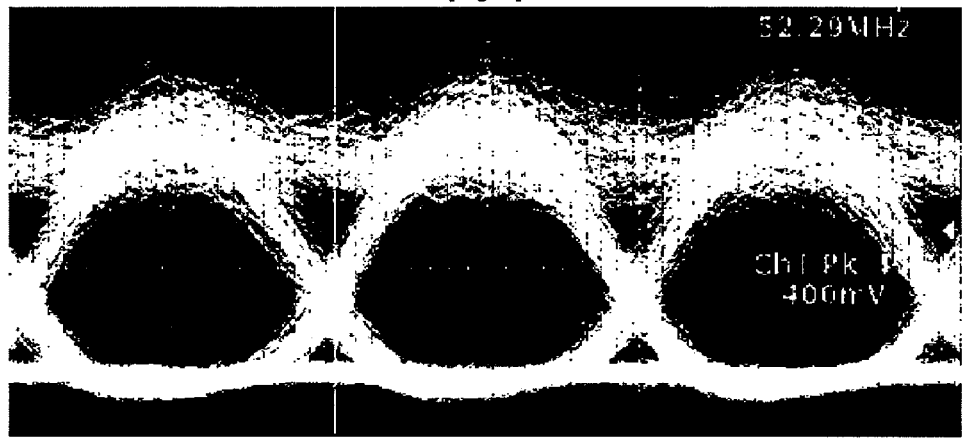
[Fig. 6]
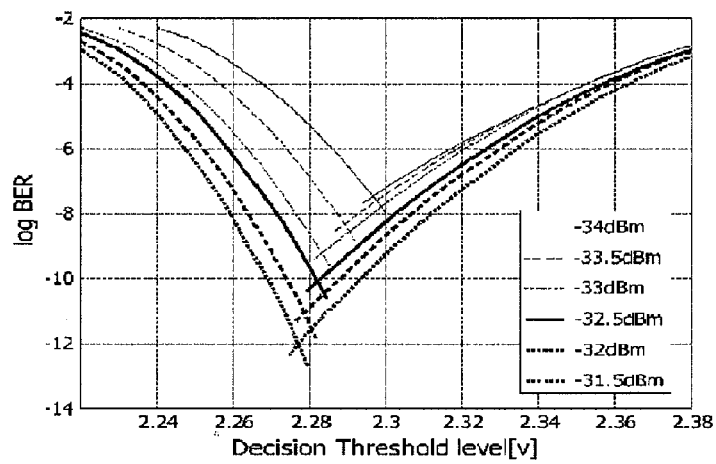
[Fig. 7]
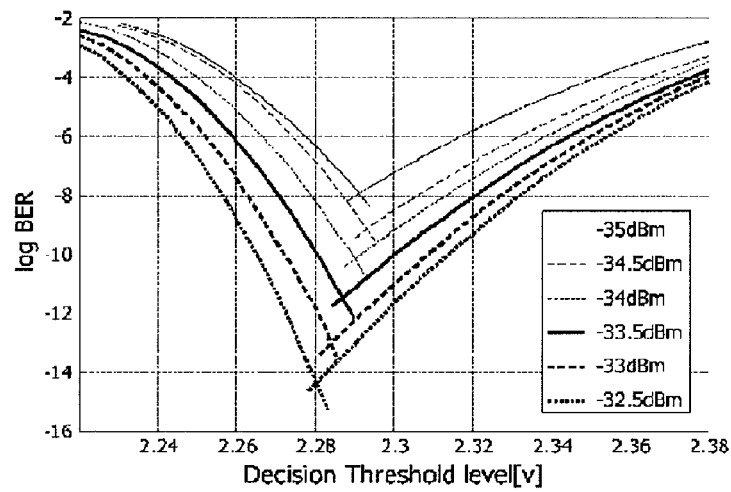
[Fig. 8]

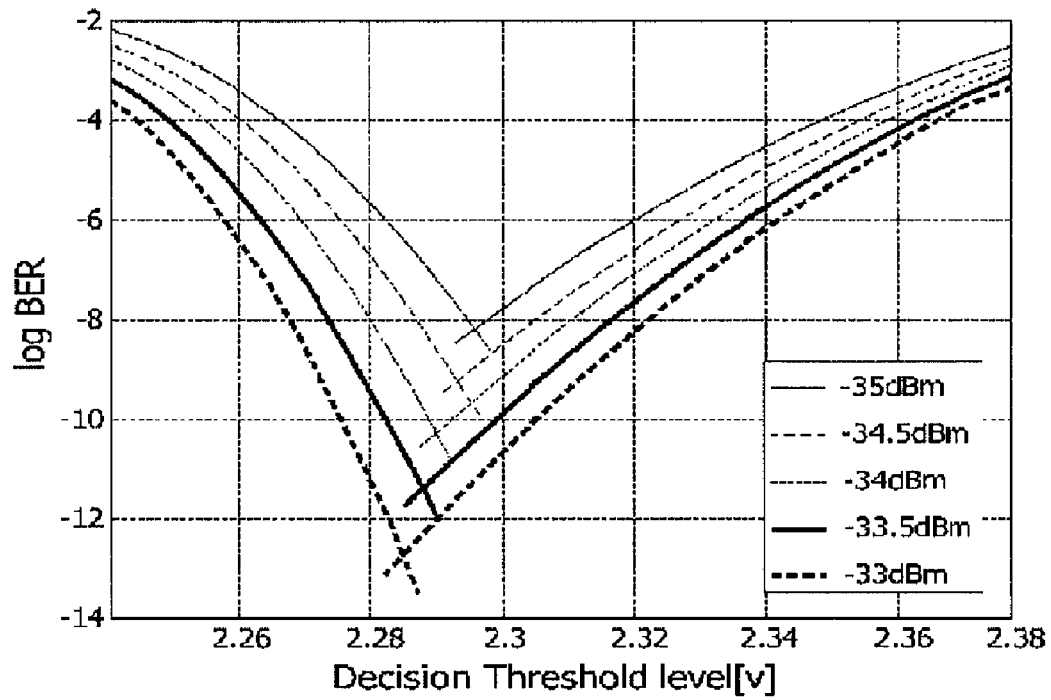
[Fig. 9]
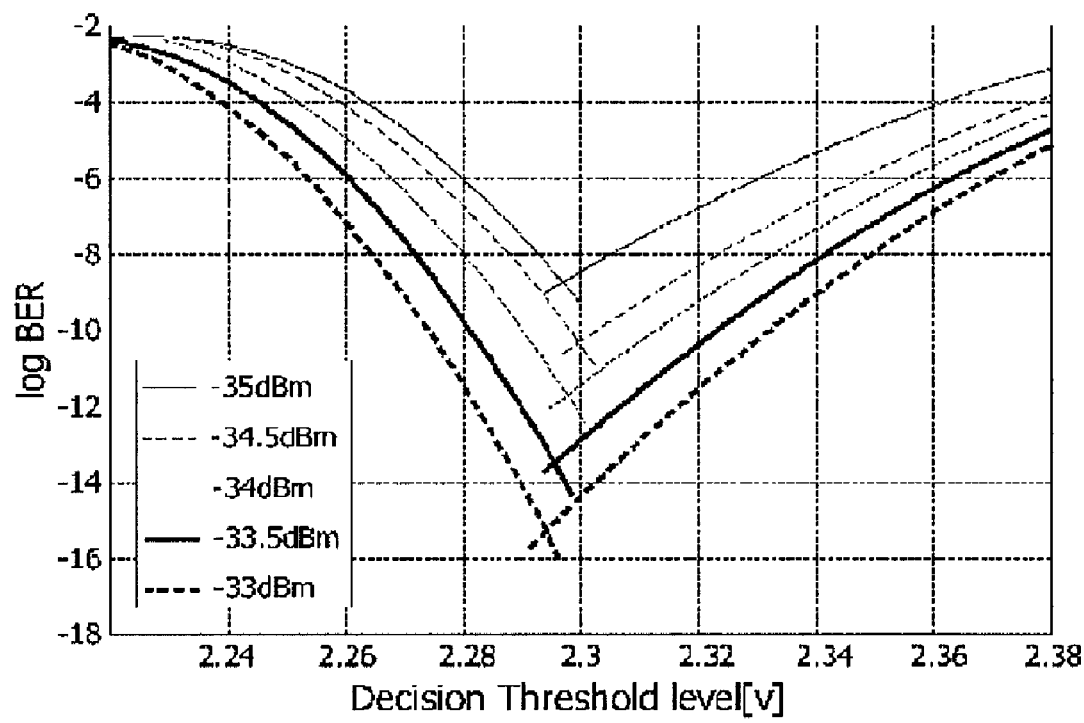
[Fig. 10]

[Fig. 11]
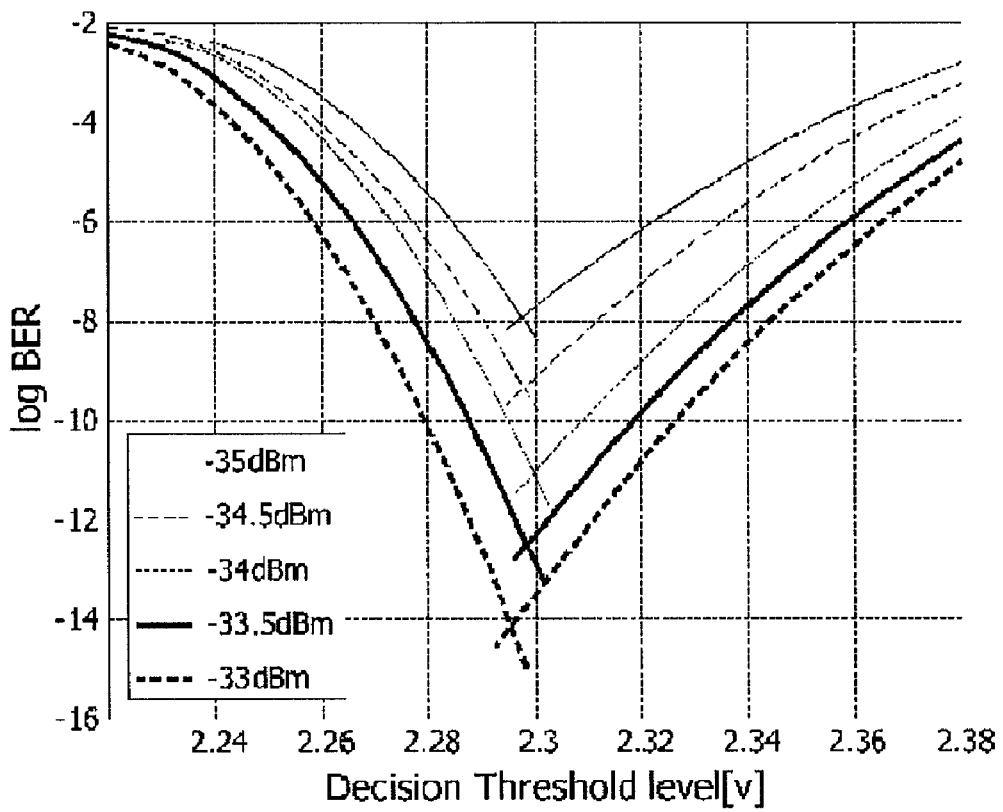
[Fig. 12]
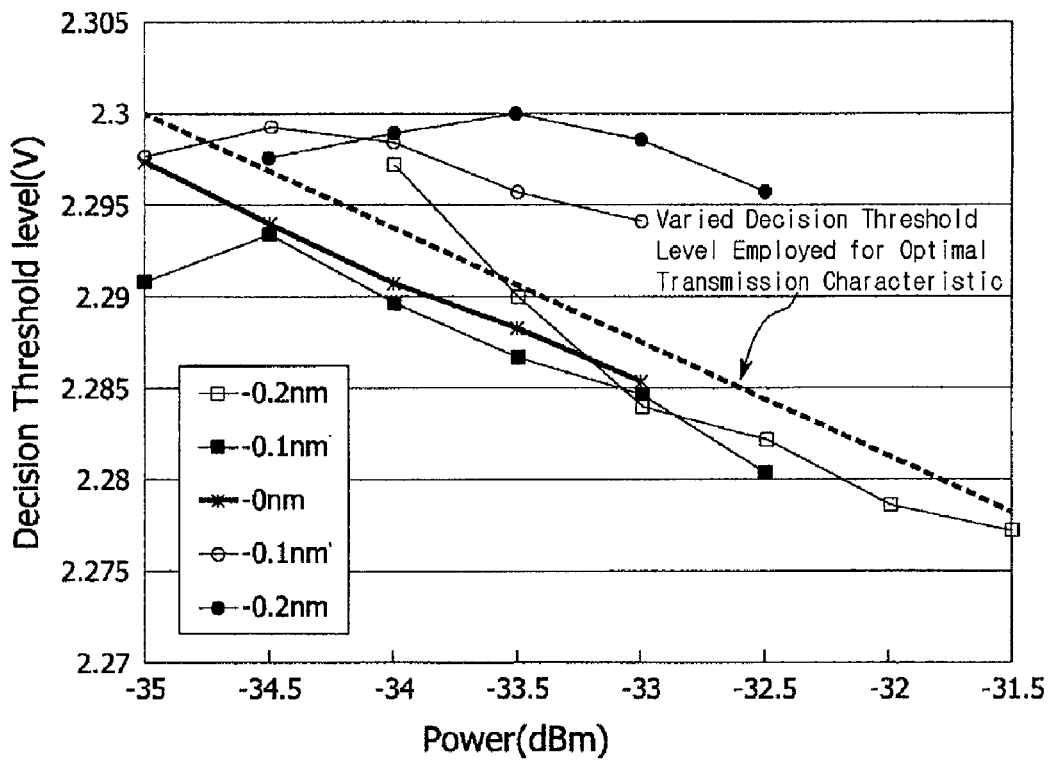

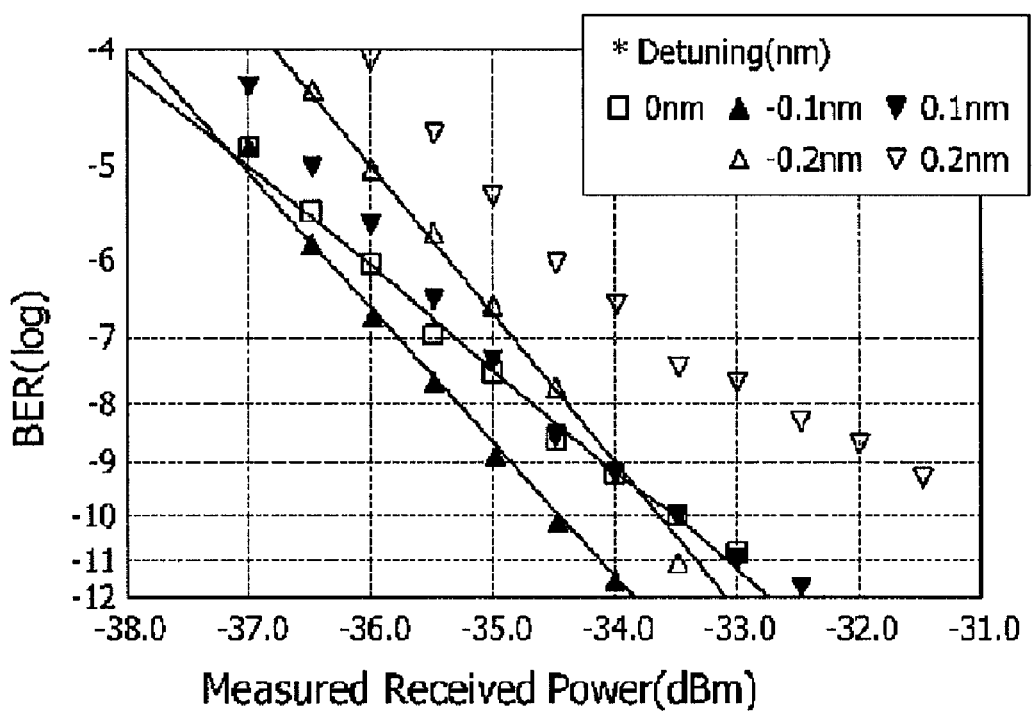
[Fig. 13]
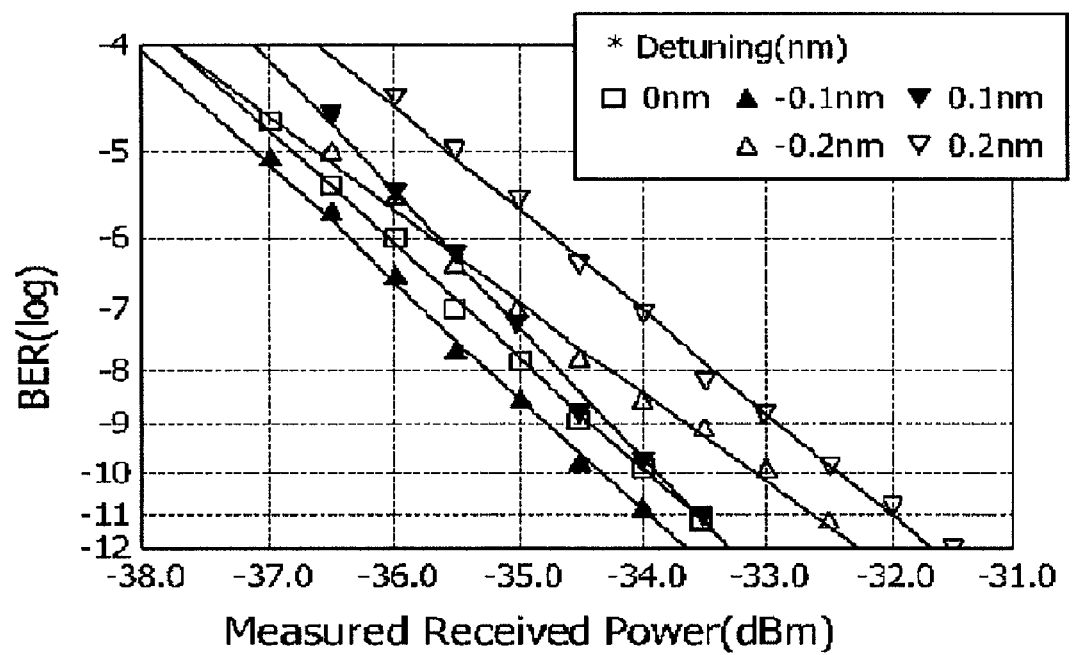
[Fig. 14]

RECEIVER HAVING AN APPARATUS FOR VARYING DECISION THRESHOLD LEVEL AND AN OPTICAL TRANSMISSION SYSTEM HAVING THE SAME

CROSS-REFERENCE TO RELATED PATENT APPLICATIONS

This application is a continuation application under 35 U.S.C. §365(c) of International Application No. PCT/KR2006/003262, filed Aug. 18, 2006 designating the United States. International Application No. PCT/KR2006/003262 was published in English as WO2007/021161 A1 on Feb. 22, 2007. This application further claims the benefit of the earlier filing dates under 35 U.S.C. §365(b) of Korean Patent Application No. 10-2005-00076330 filed Aug. 19, 2005. This application incorporates herein by reference the International Application No PCT/KR2006/003262 including the International Publication No. WO2007/021161 A1 and the Korean Patent Application No. 10-2005-00076330 in their entirety.

BACKGROUND

1. Technical Field

The present disclosure relates to an optical receiver having an apparatus for varying decision threshold level and an optical transmission system having the same. More specifically, the present disclosure relates to an optical receiver having an apparatus for varying decision threshold level capable of enhancing a transmission characteristic by adjusting a decision threshold level depending on power inputted into the optical receiver, using that a noise characteristic of level 1 may vary depending on a difference in wavelengths between a filtered incoherent light source and Fabry-Perot Laser Diode (F-P LD), and an optical transmission system having the same.

2. Discussion of Related Technology

Demand on capacity extension at an existing optical network has been required for meeting the gradually increasing data traffics and for providing a variety of multimedia services. In the existing copper-based optical network, there is a limit in bandwidth available for each subscriber. As a method to solve the above problem, a study on passive optical network (PON) technologies based on optical fiber has actively carried out, where PON is flexible and transparent, and is possible to use a broad bandwidth.

Currently, a wavelength division multiplexing (WDM) among PON technologies has been perceived to be an ultimate solution. In a WDM, one wavelength must be assigned to each subscriber and thus the essential factor in a wavelength division multiplexing-passive optical network (WDM-PON) technology is to embody a system for WDM-PON by using a low-cost transceiver. A wavelength locked F-P LD which has been suggested recently is recognized as an economic light source for a WDM-PON. Here, the wavelength locked F-P LD is a light source obtained by injecting a filtered incoherent light source or a broadband light source (hereinafter referred to BLS) into a F-P LD which is oscillated in a multi-mode and locking a wavelength of the F-P LD to be a wavelength of the filtered BLS so that the F-P LD is oscillated in a quasi-single mode.

However, the wavelength of F-P LD may vary as ambient temperature varies and the varied wavelength of F-P LD does not conform to the wavelength of a filtered incoherent light source, which leads to a degradation in a transmission quality of optical signals.

FIG. 1 illustrates a structural view of an optical receiver being used in an exemplary optical transmission system. As illustrated in FIG. 1, an optical receiver being used in an exemplary optical transmission system is comprised of a photo diode (PD) 441 for receiving an optical signal and for transforming the received optical signal into an electrical signal, a trans-impedance amplifier (TIA) 442 for pre-amplifying the electrical signal transformed by PD 441, a limiting amplifier (LA) 443 for deciding the electrical signal amplified by TIA 442 as either level "0" or level "1" and for amplifying and outputting the decision signal, and a clock and data recovery (CDR) 444 for generating a clock and data from the amplified decision signal.

LA 443 is an amplifier having a high gain and performs a function that compares an input signal with a reference value corresponding to a decision threshold level and decides the input signal as level "0" (low level) or level "1" (high level). That is, an input signal is represented as level "0" if the input signal is lower than a reference value, while being represented as level "1" if the input signal is higher than a reference value. When deciding by comparing a reversed optical signal with a reference value depending on an optical transmission system, LA 443 decides an input signal as level "0" if the input signal is lower than a reference value and decides an input signal as level "1" if the input signal is higher than a reference value. Generally, in an optical transmission system, noise of level "1" is greater than noise of level "0" due to using an optical amplifier and thus a desirable transmission characteristic of an optical signal can be obtained when a decision threshold level (i.e., a reference value) must have a lower voltage value as optical signal power has a higher value.

Further, the transmission characteristic of an optical signal described above can be applied likewise to an optical transmission system which uses, as its light source, incoherent light such as BLS or a light emitting diode (LED). In case of a wavelength-locked F-P LD which will be described as an embodiment of the present invention, a wavelength-locked F-P LD is the most complicated case because the wavelength of a wavelength-locked F-P LD may vary depending on the temperature thereof so that optimal decision threshold level may vary depending on a difference in wavelength between a filtered incoherent light source and an F-P LD and therefore a characteristic depending on temperature must be also considered.

The discussion in this section is to provide general background information, and does not constitute an admission of prior art.

SUMMARY

An aspect of the invention provides an optical receiver comprising: a photo diode (PD) configured to receive an optical signal and transform the received optical signal into an electrical signal; a trans-impedance amplifier (TIA) configured to receive and pre-amplify the electrical signal so as to provide a pre-amplified electrical signal; a limiting amplifier (LA) configured to compare the pre-amplified electrical signal with a threshold value and to determine the level of the pre-amplified electrical signal as either level "0" or level "1"; and a control circuit configured to adjust the threshold value in view of the value of the optical signal and to provide the adjusted threshold value to the limiting amplifier.

In the foregoing optical receiver, the control circuit may comprise an amplifier configured to receive the electrical signal from the photo diode and to amplify the electrical signal to an amplified electrical signal substantially proportional to the value of the optical signal; a direct circuit (DC)

configured to provide a substantially constant direct voltage; and an adder configured to add the direct voltage and the amplified electrical signal so as to provide a resulting value, which is the adjusted threshold value. The optical receiver may be operable in a bi-directional wavelength division multiplexing-passive optical network (WDM-PON). The optical receiver may comprise a first noise when the optical signal represents the level 1 as determined by the limiting amplifier, wherein the optical signal comprises a second noise when the optical signal represents level 0 as determined by the limiting amplifier, wherein the first noise is greater than the second noise. The limiting amplifier may be configured to determine level 0 when the pre-amplified electrical signal is greater than the threshold value and to determine level 1 when the pre-amplified electrical signal is smaller than the threshold value, wherein the control circuit is configured to adjust the threshold value such that the threshold value increases as the value of the optical signal increases.

Another aspect of the invention provides an optical transmission system comprising: a first arrayed waveguide grating (AWG) configured to filter light from a light source based on wavelengths; an optical transceiver configured to receive a portion of the filtered light and configured to send wavelength-locked light to the first AWG, wherein the first AWG is further configured to multiplex wavelength-locked light to generate a wavelength division multiplexed (WDM) signal; a second AWG configured to receive the WDM signal from the first AWG and demultiplex the WDM signal into a plurality of optical signals; and an optical receiver configured to receive one of the plurality of optical signals and transform the received optical signal to an electrical signal, wherein the optical receiver is further configured to pre-amplify the electrical signal so as to provide a pre-amplified electrical signal, configured to compare the pre-amplified electrical signal with a threshold value and to determine the level of the pre-amplified electrical signal as level "0" or level "1", and configured to adjust the threshold value in view of the value of the second optical signal.

In the foregoing system, the optical receiver may comprise a photo diode (PD) configured to receive the second optical signal and transform the received optical signal into an electrical signal; a trans-impedance amplifier (TIA) configured to pre-amplify the electrical signal so as to provide the pre-amplified electrical signal; a limiting amplifier (LA) configured to compare the pre-amplified electrical signal with a threshold value and to determine the level of the pre-amplified electrical signal as either level "0" or level "1"; and a control circuit configured to adjust the threshold value in view of the value of the second optical signal so as to provide the adjusted threshold value to the LA. The control circuit may comprise an amplifier configured to receive the electrical signal from the photo diode and to amplify the electrical signal to an amplified electrical signal substantially proportional to the value of the optical signal; a direct circuit (DC) configured to provide a substantially constant direct voltage; and an adder configured to add the direct voltage and the amplified electrical signal so as to provide a resulting value, which is the adjusted threshold value. The optical signal may comprise a first noise when the optical signal represents the level 1 as determined by the limiting amplifier, wherein the optical signal comprises a second noise when the optical signal represents level 0 as determined by the limiting amplifier, wherein the first noise is greater than the second noise. The optical signal may comprise a first noise when the optical signal represents the level 1 as determined by the limiting amplifier, wherein the optical signal comprises a second noise when the optical signal represents level 0 as determined by the limiting amplifier, wherein the first noise is greater than the second noise.

Still in the foregoing system, the light source may comprise at least one selected from the group consisting of a high-power light emitting diode (LED), an erbium-doped fiber amplifier (EDFA) emitting an amplified spontaneous emission (ASE), a super luminescent diode (SLD), and a broadband light source (BLS). The light source may comprise at least one selected from the group consisting of a high-power light emitting diode (LED), an erbium-doped fiber amplifier (EDFA) emitting an amplified spontaneous emission (ASE), a super luminescent diode (SLD), and a broadband light source (BLS). The limiting amplifier may be configured to determine level 0 when the pre-amplified electrical signal is greater than the threshold value and to determine level 1 when the pre-amplified electrical signal is smaller than the threshold value, wherein the control circuit is configured to adjust the threshold value such that the threshold value increases as the value of the optical signal increases. The limiting amplifier may be configured to determine level 0 when the pre-amplified electrical signal is greater than the threshold value and to determine level 1 when the pre-amplified electrical signal is smaller than the threshold value, wherein the control circuit is configured to adjust the threshold value such that the threshold value increases as the value of the optical signal increases. The optical transceiver may comprise one selected from the group consisting of a reflective semiconductor optical amplifier (RSOA), an LED and an F-P LD. The optical transceiver may comprise one selected from the group consisting of a reflective semiconductor optical amplifier (RSOA), an LED and an F-P LD.

According to one aspect of the present invention, the present invention provides an optical receiver being employed in an optical transmission system comprising a photo diode (PD) for receiving an optical signal and transforming the received optical signal into an electrical signal; a trans-impedance amplifier (TIA) for pre-amplifying the electrical signal transformed by the PD; a limiting amplifier (LA) for deciding the electrical signal amplified by the TIA as either level "0" or level "1" and for amplifying the decision signal; a clock and data recovery (CDR) for generating a clock and data from the amplified decision signal by the LA; and a control circuit for adjusting a decision threshold level depending on the received optical signal power by the PD and for providing the adjusted decision threshold level with the LA.

According to another aspect of the present invention, the present invention provides an optical transmission system comprising a first arrayed waveguide grating (AWG) for filtering a broadband light source (BLS) into n-numbered wavelengths; n-numbered Fabry-Perot Laser Diode (F-P LD) into which the filtered light by the first AWG is injected and for outputting wavelength-locked light into the first AWG; an optical fiber for transmitting the light of the BLS and a wavelength division multiplexing (WDM) signal outputted from the first AWG; an optical circulator for bypassing and outputting the transmitted WDM signal; a second AWG for demultiplexing the WDM signal bypassed and outputted from the optical circulator into n-numbered wavelengths; and an optical receiver for receiving the demultiplexed optical signal from the second AWG, for transforming the demultiplexed optical signal into an electrical signal, for pre-amplifying the transformed electrical signal, for deciding the amplified electrical signal as level "0" or level "1" and for amplifying the decision signal, for generating a clock and data from the amplified decision signal, and for being able to adjust a decision threshold level depending on the received optical signal power.

Further features and advantages of the present invention can be obviously understood with reference to the accompanying drawings where same or similar reference numerals indicate same components.

An apparatus for varying decision threshold level which is used in an optical receiver of an optical transmission system in accordance with the present invention can be embodied without employing a complex temperature control system.

In addition, it is possible to embody a WDM-PON economically which guarantees a desirable transmission efficiency of an optical signal by employing an apparatus for varying decision threshold level in accordance with the present invention.

Moreover, the present invention may be widely applied to an extent to any optical receiving system such as an optical receiver which receives an optical signal where noise of level "1" is greater than noise of level "0", like a WDM-PON which employs, as its light source, not only a wavelength-locked F-P LD but also an amplifier or incoherent light accordance with the embodiments of the present invention.

BRIEF DESCRIPTION OF THE DRAWINGS

FIG. 1 illustrates a structural view of an optical receiver being used in an exemplary optical transmission system.

FIG. 2 illustrates a structural view of an optical receiver having an apparatus for varying decision threshold level which can be used in an optical transmission system in accordance with an embodiment of the present invention.

FIG. 3 illustrates a structural view of a WDM-PON having a wavelength-locked F-P LD system in accordance with an embodiment of the present invention.

FIG. 4 illustrates a structural view of a WDM-PON having a plurality of wavelength-locked F-P LD systems in accordance with an embodiment of the present invention.

FIGS. 5 and 6 respectively illustrate an eye diagram depending on a difference in wavelength between a filtered incoherent light source and an F-P LD in a WDM-PON having a wavelength-locked F-P LD system in accordance with an embodiment of the present invention.

FIGS. 7 to 11 respectively illustrate a graph of decision threshold level versus bit error rate based on received optical power, depending on a difference in wavelength between a filtered incoherent light source and an F-P LD in a WDM-PON in accordance with an embodiment of the present invention.

FIG. 12 illustrates a graph of a decision threshold level in accordance with an embodiment of the present invention.

FIGS. 13 and 14 respectively illustrate a graph of bit error rates depending on detuning before and after applying a decision threshold level in accordance with an embodiment of the present invention.

DETAILED DESCRIPTION OF EMBODIMENTS

Hereinafter, the present invention is described in more detail with reference to embodiments thereof and the appended drawings.

FIG. 2 illustrates a structural view of an optical receiver having an apparatus for varying decision threshold level which can be used in an optical transmission system in accordance with an embodiment of the present invention. As illustrated in FIG. 2, an optical receiver 440 having an apparatus for varying decision threshold level 445 decides an input data value (i.e., electrical signal value) to be level "1" if the input data value is higher than a decision threshold level and to be level "0" if the input data value is lower than a decision threshold level, and have a configuration of where a control circuit 445 is added to an LA 443 for amplifying a decided signal as shown in FIG. 1. That is, the control circuit 445 in accordance with an embodiment of the present invention adjusts a decision threshold level depending on the received optical signal power and provides the adjusted decision threshold level with LA 443 so that an embodiment of the present invention suggests a method of obtaining an optimal transmission quality of an optical signal.

The control circuit 445, which is a specific embodiment of an apparatus for varying a decision threshold level 445 in accordance with an embodiment of the present invention described above, includes a direct circuit (DC) 445c for outputting a fixed direct voltage value, an amplifier 445a for providing an output value proportional to optical signal power, and an adder 445b for adding the fixed direct voltage value outputted from DC 445c and the output value proportional to optical signal power provided from the amplifier 445a. That is, as an optical signal is inputted into a photo diode (PD) 441, PD 441 transforms the inputted optical signal into an electrical signal. The transformed electrical signal is inputted into TIA 442 and the amplifier 445a of the control circuit 445. The amplifier 445a provides an output value proportional to the inputted optical signal power with the adder 445b. The adder 445a adds the output value provided from the amplifier 445a and a fixed direct voltage value outputted from DC 445c and outputs a resulting value to LA 443. As LA 443 uses the resulting value inputted from the adder 445b as a decision threshold level, thus the decision threshold level being used in LA 443 varies depending on the inputted optical signal power.

FIG. 3 illustrates a structural view of a WDM-PON having a wavelength-locked F-P LD system in accordance with an embodiment of the present invention.

Referring to FIG. 3, if a temperature control device is not used, a wavelength of F-P LD 100 may vary depending on a change of ambient temperature and there exists a region where the wavelength of F-P LD 100 does not conform to a wavelength of a filtered BLS 420. a noise characteristic of a signal having level "1" may vary depending on a degree of conformity or inconformity in wavelength between the filtered BLS 420 and F-P LD 100, which resultingly increases a bit error rate (BER) of a signal received at the optical receiver 440. However, in case that a decision threshold level is adjusted by means of a method in accordance with an embodiment of the present invention as suggested in FIG. 2, then BER of an optical signal can be reduced and therefore it is possible to improve a transmission quality of an optical signal dramatically.

Referring back to FIGS. 2 and 3, a WDM-PON having a wavelength-locked F-P LD system of an embodiment of the present invention comprises a first AWG 200, a F-P LD 100, an optical circulator 410, a second AWG 430, and an optical receiver 440, each component will be described in sequence.

A first AWG 200 filters light injected from BLS 420 into lights having n-numbered wavelengths. One of the filtered lights through the first AWG 200 is inputted into F-P LD 100 and locked the wavelength of F-P LD 100. Light outputted from the wavelength-locked F-P LD 100 is wavelength division multiplexed (WDM) by the first AWG 200, and a WDM signal passes an optical fiber 300, bypasses an optical circulator 410 and is outputted therefrom. The WDM signal bypassed at and outputted from the optical circulator 410 is demultiplexed into an n-group by a second AWG 430. An optical signal which is demultiplexed by the second AWG 430 is provided with an optical receiver 440. The optical receiver 440 receives the optical signal provided by the second AWG 430, transforms it into an electrical signal, pre-amplifies the transformed electrical signal, decides the amplified electrical signal as level "0" or level "1" and amplifies the decision signal, generates a clock and data from the amplified decision signal, and adjusts a decision threshold level by means of a control circuit 445 depending on the received optical signal power. The first AWG 200 and the second AWG 430 are respectively a arrayed waveguide grating.

Here, instead of F-P LD 100 described above, an embodiment of the present invention may employ any one of a reflective semiconductor optical amplifier (RSOA), an LED and an anti-reflection coated F-P LD. Further, as a BLS 420 to be injected to the wavelength-locked F-P LD 100, any one of a high-power light emitting diode (LED), an erbium-doped fiber amplifier (EDFA) emitting an amplified spontaneous emission (ASE), and a super luminescent diode (SLD) may be used.

Hereinafter, specific structure and operation of an optical receiver 440 in accordance with an embodiment of the present invention will be described. The optical receiver 440 of an embodiment of the present invention includes PD 441, TIA 442, LA 443, a control circuit 445 and CDR 444. Each component is described in detail below.

Upon receiving an optical signal from the second AWG 430, PD 441 transforms the optical signal into an electrical signal and provides the transformed electrical signal with TIA 442. TIA 442 pre-amplifies the transformed electrical signal and provides the amplified electrical signal with LA 443. LA 443 decide the electrical signal amplified by TIA 442 as level "0" or level "1" depending on a decision threshold level, amplifies the decision signal, and provides the amplified decision signal with CDR 444. CDR 444 generates a clock and data from the amplified decision signal provided by LA 443.

In addition, the electrical signal transformed by PD 441 is provided to a control circuit 445. The control circuit 445 includes an amplifier 445a, DC 445c and an adder 445b as shown in FIG. 2. The electrical signal transformed by PD 441 is also provided to the amplifier 445a. The amplifier 445a provides an output value with the adder 445b where the output value is proportional to the inputted optical signal inputted into the optical receiver 440. DC 445c provides a fixed direct voltage value with the adder 445b. The adder 445b adds the fixed direct voltage value provided by DC 445c and the output value being proportional to the inputted optical signal provide by the optical receiver 440. After that, the resulting value outputted from adder 445b is provided to LA 443 and is used as a decision threshold level for the amplified electrical signal by TIA 442. In this way, the control circuit 445 of an embodiment of the present invention adjusts the decision threshold level depending on the received optical signal power.

In the embodiments of the present invention as shown in FIGS. 2 and 3, an EDFA is employed as the BLS 420 for a light source and a laser diode where a front facet reflectivity thereof is anti-reflection coated is employed as the F-P LD 100 into which a filtered incoherent light source is injected.

Referring back to FIGS. 2 and 3, inherent light outputted from a BLS 420 of a central office (CO) 400 passes an optical fiber 300 for transmission, is separated by a first AWG 200 which filters the inherent light into n-numbered wavelengths (n is an output port number of or a channel number of WDM signals) and is injected into an F-P LD 100 which oscillates in a multi-mode. The data directly modulated at the wavelength-locked F-P LD 100 is transmitted to CO 400 after passing through the first AWG 200 and the optical fiber 300 for transmission. The transmitted optical signal is transmitted to an optical receiver 440, which is a receiving end, through a second AWG 430. The optical signal inputted into PD 441 of the optical receiver 440 is transformed into an electrical signal and is inputted into LA 443 through TIA 442.

When the control circuit 445 of an embodiment of the present invention as shown in FIGS. 2 and 3 described above changes a decision threshold level of LA 443, LA 443 decides the received optical signal as level "0" or level "1" based on a changed decision threshold level.

An apparatus for varying a decision threshold level or the control circuit 445, which is used in the optical receiver 440 of an optical transmission system of an embodiment of the present invention described above, is applied to a case where a noise component of level "1" is higher than a noise component of level "0". However, if the level of an optical signal is reversed and thus level "0" is a high voltage, a decision threshold level is reversed accordingly. Thus, a decision threshold level must be also changed in a way that the decision threshold level is increased to satisfy an optimal BER, as received optical signal power is increased.

FIG. 4 illustrates a structural view of a WDM-PON having a plurality of wavelength-locked F-P LD systems in accordance with an embodiment of the present invention. As illustrated in FIG. 4, a wavelength-locked F-P LD system 100 may be also applied to a bidirectional WDM-PON system. In this case, n-numbered F-P LDs 100a, 100b, . . . and n-numbered optical receivers 440a, 440b, . . . can be used for the first AWG 299 and the second AWG 300, respectively.

If ambient temperature varies in a wavelength-locked F-P LD 100 being used in the embodiments of the present invention as shown in FIGS. 3 and 4, the temperature of the F-P LD 100 at a subscriber side is also varied which changes a wavelength of the F-P LD 100. However, because a wavelength of a filtered BLS 420 which corresponds to a wavelength assigned to each subscriber is fixed, it occurs that the wavelength of the filtered BLS 420 may or may not correspond to the wavelength assigned to each subscriber, depending on ambient temperature. Accordingly, a noise characteristic of level "1" may be changed.

FIGS. 5 and 6 respectively illustrate an eye diagram depending on a difference in wavelength between a filtered incoherent light source and an F-P LD in a WDM-PON having a wavelength-locked F-P LD system in accordance with an embodiment of the present invention. As illustrated in FIGS. 5 and 6, FIG. 5 shows a case that the wavelength of a filtered BLS corresponds to the wavelength of an F-P LD, while FIG. 6 shows a case that the wavelength of a filtered BLS does not correspond to the wavelength of an F-P LD.

In a case that the wavelength of a filtered BLS does not correspond to the wavelength of an F-P LD as shown in FIG. 6, it is recognizable that a beating noise component becomes greater and distribution of level "1" is widened, when compared with a case that the wavelength of a filtered BLS corresponds to the wavelength of an F-P LD as shown in FIG. 5. Therefore, it is possible to increase transmission efficiency by changing a decision threshold level depending on received optical signal power as suggested in the present invention, instead of using a fixed decision threshold level.

FIGS. 7 to 11 respectively illustrate a graph of decision threshold level versus bit error rate based on received optical power, depending on a difference in wavelength between a filtered incoherent light source and an F-P LD in a WDM-PON in accordance with an embodiment of the present invention. As illustrated in FIGS. 7 to 11, FIGS. 7 to 11 show measured values that detuning is 0.2 nm, 0.1 nm, 0 nm, −0.1 nm and −0.2 nm, respectively, where detuning is defined as a value corresponding to a wavelength difference between a filtered BLS and an F-P LD.

For example, when reviewing FIG. 7, there is a characteristic that a decision threshold level to satisfy an optimal BER is lowered, as optical signal power is increased. It is also recognizable that the above characteristic has similar tendency for different detuning values, respectively, as can be seen from FIGS. 7 to 11. Therefore, there exists an optimal decision threshold level depending on received optical signal power and it is possible to increase transmission efficiency if a decision threshold level is able to be lowered depending on the received optical signal power. However, since an optimal decision threshold level also varies depending on a detuning value as can be seen from FIGS. 7 to 11, it is recognizable that employing a wavelength-locked F-P LD by a filtered BLS, which is described in the above embodiments, is the most complex case.

FIG. 12 illustrates a graph of a decision threshold level in accordance with an embodiment of the present invention. As illustrated in FIG. 12, the graph shows well decision threshold levels depending on received optical signal power. As can be seen from FIG. 12, because an optical transmission system being used must be operated in all temperature area to satisfy an optimal BER, it is possible to obtain an optimal BER by changing a decision threshold level appropriately to be a dotted line depending on respective optical signal power. The range of an alpha ($\alpha$) value corresponds to −0.001∼−0.02.

FIGS. 13 and 14 respectively illustrate a graph of bit error rates depending on detuning before and after applying a decision threshold level in accordance with an embodiment of the present invention. As illustrated in FIGS. 13 and 14, FIG. 13 shows a case of using a fixed decision threshold level being used in an exemplary optical receiver as shown in FIG. 1, while FIG. 14 shows a case of using a variable decision threshold level being used in an optical receiver 440 of an embodiment of the present invention.

As can be seen from FIG. 13, there is an area that cannot obtain error-free transmission efficiency for detuning values of 0.2 nm and 0.1 nm. Thus, a separate temperature control device for locking a wavelength of F-P LD into a specific wavelength is required to be used in order to obtain error-free transmission efficiency for the whole temperature region, regardless of temperature. This requirement for employing a separate temperature control device makes a whole system complex, and increases costs and lowers economical efficiency as well.

However, as can be seen from FIG. 14, in case of employing an optical receiver 440 having an apparatus for varying a decision threshold level 445 of an embodiment of the present invention as suggested in FIG. 2, it is possible to recognize that there exists an area that can obtain error-free transmission efficiency for the whole temperature region. When applying the above principle to a plurality of optical receivers 440a, 440b, . . . at CO 400 side of an embodiment of the present invention as shown in FIG. 4, it is possible not only to embody an optical transmission system such as a WDM-PON at low costs but also to obtain a desirable optical transmission quality of an optical signal.

The technical features of an embodiment of the present invention described above correspond to an explanation on an optical receiver of CO 400 where a subscriber transmits data to CO 400 (an up-stream case). However, it is fully understood by a skilled person in the art that the technical features of an embodiment of the present invention described above can be applied to an optical receiver of a subscriber in a case that CO 400 transmits data to a subscriber (a down-stream case). Further, the technical features of an embodiment of the present invention described above can be applied to an optical receiver which receives an optical signal where noise of level "1" is higher than noise of level "0". For example, because noise mainly occurs at level "1" in a WDM-PON employing an optical amplifier so that a decision threshold level moves to a lower voltage compared with a case that an optical amplifier is not employed, it is possible to enhance a transmission quality of an optical signal by using the technical features of an embodiment of the present invention. However, the present invention exemplifies a case that level "0" is a lower voltage and, if signal level is revered and thus level "0" is a higher voltage, a decision threshold level is also reversed so that a decision threshold level must be changed to be increased as input optical signal power is increased.

Although a WDM-PON is exemplified as a specific embodiment of an optical transmission system which employs an optical receiver having an apparatus for varying a decision threshold level in embodiments of the present invention described above, it is fully understood by a skilled person in the art that an optical receiver having an apparatus for varying a decision threshold level can be applied to a general optical network or a general optical transmission system, other than a WDM-PON.

As described above, an apparatus for varying decision threshold level being used in an optical receiver of an optical transmission system in accordance with the present invention can be embodied without employing a complex temperature control system.

In addition, it is possible to embody a WDM-PON economically which guarantees a desirable transmission efficiency of an optical signal by employing an apparatus for varying decision threshold level in accordance with the present invention.

Moreover, the present invention may be widely applied to an extent to any optical receiving system such as an optical receiver which receives an optical signal where noise of level "1" is greater than noise of level "0", like a WDM-PON light which employs, as its light source, not only a wavelength-locked F-P LD but also an amplifier or incoherent in accordance with the embodiments of the present invention.

As various modifications could be made in the constructions and method herein described and illustrated without departing from the scope of the present invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:
1. An optical receiver comprising:
a photo diode (PD) configured to receive an optical signal and transform the received optical signal into an electrical signal;
a trans-impedance amplifier (TIA) configured to receive and pre-amplify the electrical signal so as to provide a pre-amplified electrical signal;
a limiting amplifier (LA) configured to compare the pre-amplified electrical signal with a threshold value and to determine the level of the pre-amplified electrical signal as either level "0" or level "1", wherein the limiting amplifier is configured to determine level 1 when the pre-amplified electrical signal is greater than the thresh- old value and to determine level 0 when the pre-amplified electrical signal is smaller than the threshold value; and a control circuit configured to adjust the threshold value such that the threshold value is lowered when power of the optical signal becomes higher.

2. The optical receiver of claim 1, wherein the control circuit comprises:

an amplifier configured to receive the electrical signal from the photo diode and to amplify the electrical signal with a proportionality constant to provide an amplified electrical signal substantially proportional to the value of the optical signal, wherein the proportionality constant has a negative value;

a direct circuit (DC) configured to provide a substantially constant direct voltage; and an adder configured to add the direct voltage and the amplified electrical signal so as to provide a resulting value.

3. The optical receiver of claim 1, wherein the optical receiver is operable in a bi-directional wavelength division multiplexing-passive optical network (WDM-PON).

4. The optical receiver of claim 1, wherein the optical signal comprises a first noise when the optical signal represents the level 1 as determined by the limiting amplifier, wherein the optical signal comprises a second noise when the optical signal represents level 0 as determined by the limiting amplifier, wherein the first noise is greater than the second noise.

5. The optical receiver of claim 2, wherein the negative proportionality constant ranges from about from −0.001 to −0.02.

6. An optical transmission system comprising:

a first arrayed waveguide grating (AWG) configured to filter light from a light source based on wavelengths;

an optical transceiver configured to receive a portion of the filtered light and configured to send wavelength-locked light to the first AWG, wherein the first AWG is further configured to multiplex wavelength-locked light to generate a wavelength division multiplexed (WDM) signal;

a second AWG configured to receive the WDM signal from the first AWG and demultiplex the WDM signal into a plurality of optical signals; and an optical receiver configured to receive one of the plurality of optical signals and transform the received optical signal to an electrical signal, wherein the optical receiver is further configured to pre-amplify the electrical signal so as to provide a pre-amplified electrical signal, configured to compare the pre-amplified electrical signal with a threshold value and to determine the level of the pre-amplified electrical signal as level "0" or level "1", and configured to adjust the threshold value such that the threshold value is lowered when power of the optical signal becomes higher, wherein the optical receiver is configured to determine level 1 when the pre-amplified electrical signal is greater than the threshold value and to determine level 0 when the pre-amplified electrical signal is smaller than the threshold value.

7. The optical transmission system of claim 6, wherein the optical receiver comprises:

a photo diode (PD) configured to receive the optical signal and transform the received optical signal into an electrical signal;

a trans-impedance amplifier (TIA) configured to pre-amplify the electrical signal so as to provide the pre-amplified electrical signal;

a limiting amplifier (LA) configured to compare the pre-amplified electrical signal with a threshold value and to determine the level of the pre-amplified electrical signal as either level "0" or level "1"; and a control circuit configured to adjust the threshold value in view of the value of the optical signal so as to provide the adjusted threshold value to the LA.

8. The optical transmission system of claim 7, wherein the control circuit comprises:

an amplifier configured to receive the electrical signal from the photo diode and to amplify the electrical signal with a proportionality constant to provide an amplified electrical signal substantially proportional to the value of the optical signal, wherein the proportionality constant has a negative value;

a direct circuit (DC) configured to provide a substantially constant direct voltage; and an adder configured to add the direct voltage and the amplified electrical signal so as to provide a resulting value, which is the adjusted threshold value.

9. The optical transmission system of claim 7, wherein the optical signal comprises a first noise when the optical signal represents the level 1 as determined by the limiting amplifier, wherein the optical signal comprises a second noise when the optical signal represents level 0 as determined by the limiting amplifier, wherein the first noise is greater than the second noise.

10. The optical transmission system of claim 8, wherein the optical signal comprises a first noise when the optical signal represents the level 1 as determined by the limiting amplifier, wherein the optical signal comprises a second noise when the optical signal represents level 0 as determined by the limiting amplifier, wherein the first noise is greater than the second noise.

11. The optical transmission system of claim 6, wherein the light source comprises at least one selected from the group consisting of a high-power light emitting diode (LED), an erbium-doped fiber amplifier (EDFA) emitting an amplified spontaneous emission (ASE), a super luminescent diode (SLD), and a broadband light source (BLS).

12. The optical transmission system of claim 8, wherein the light source comprises at least one selected from the group consisting of a high-power light emitting diode (LED), an erbium-doped fiber amplifier (EDFA) emitting an amplified spontaneous emission (ASE), a super luminescent diode (SLD), and a broadband light source (BLS).

13. The optical transmission system of claim 7, wherein the optical transceiver comprises one selected from the group consisting of a reflective semiconductor optical amplifier (RSOA), an LED and an F-P LD.

14. The optical transmission system of claim 8, wherein the optical transceiver comprises one selected from the group consisting of a reflective semiconductor optical amplifier (RSOA), an LED and an F-P LD.

15. The optical transmission system of claim 7, wherein the negative proportionality constant ranges from about from −0.001 to −0.02.

16. An optical receiver comprising:

a photo diode (PD) configured to receive an optical signal and transform the received optical signal into an electrical signal;

a trans-impedance amplifier (TIA) configured to receive and pre-amplify the electrical signal so as to provide a pre-amplified electrical signal;

a limiting amplifier (LA) configured to compare the pre-amplified electrical signal with a threshold value and to determine the level of the pre-amplified electrical signal as either level "0" or level "1", wherein the limiting amplifier is configured to determine level 0 when the pre-amplified electrical signal is greater than the threshold value and to determine level 1 when the pre-amplified electrical signal is smaller than the threshold value; and a control circuit configured to provide a control input to the limiting amplifier for adjusting the threshold value thereof such that the threshold value increases as power of the optical signal increases.

17. The optical receiver of claim 16, wherein the control circuit comprises:

an amplifier configured to receive the electrical signal from the photo diode and to amplify the electrical signal to an amplified electrical signal, which is substantially proportional to the value of the optical signal;

a direct circuit (DC) configured to provide a substantially constant direct voltage; and an adder configured to add the direct voltage and the amplified electrical signal so as to provide a resulting value.

18. The optical receiver of claim 16, wherein the optical receiver is operable in a bi-directional wavelength division multiplexing-passive optical network (WDM-PON).

* * * * *